Figure 1:
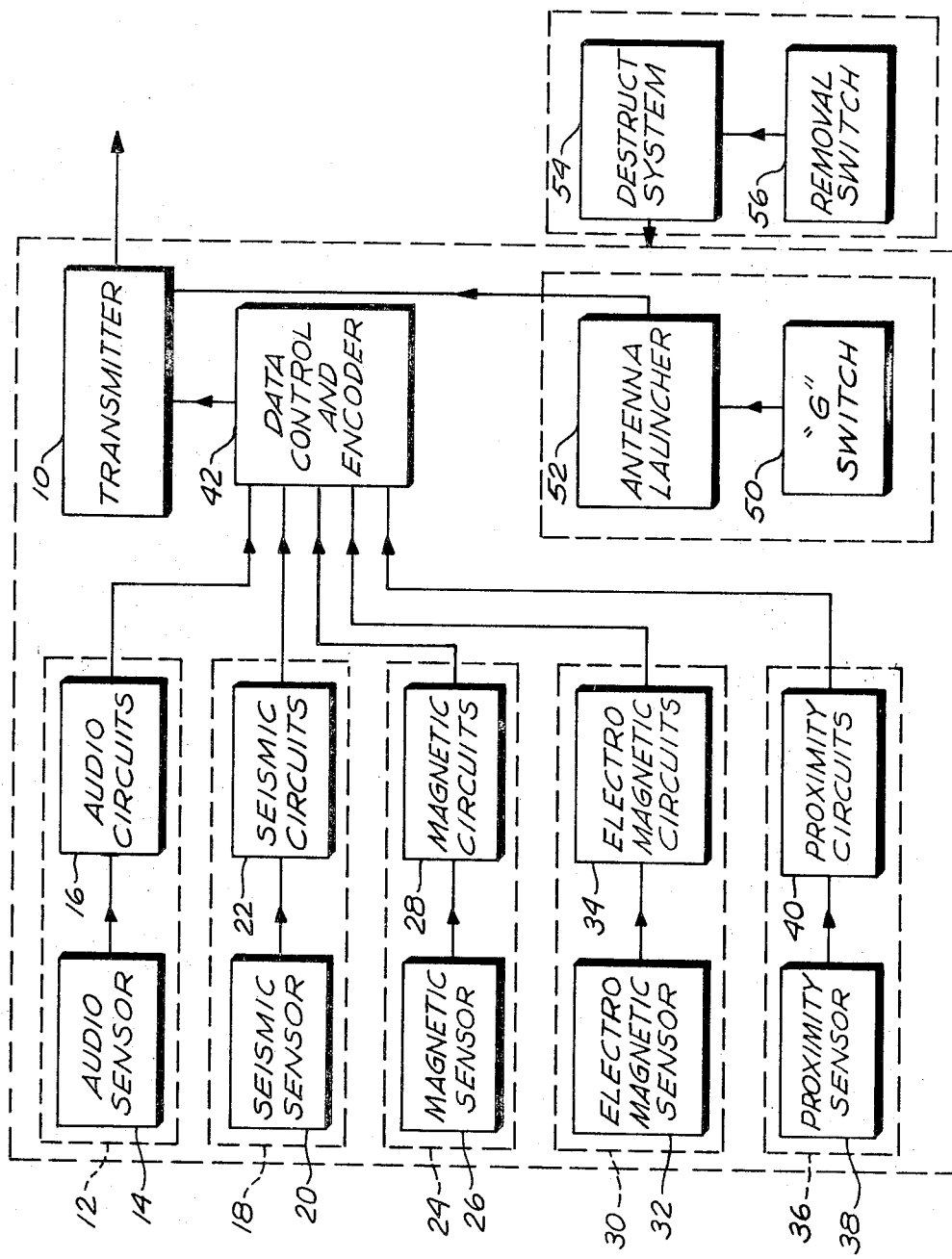

United States Patent

[11] 3,573,817

| [72] | Inventor | Artie E. Akers<br>San Diego, Calif. |
|---|---|---|
| [21] | Appl. No. | 710,710 |
| [22] | Filed | Feb. 28, 1968 |
| [45] | Patented | Apr. 6, 1971 |
| [73] | Assignee | North American Rockwell Corporation |

[54] MONITORING SYSTEM
8 Claims, 6 Drawing Figs.

[52] U.S. Cl. .................................................. 340/420,
340/258, 340/261, 340/276
[51] Int. Cl. ..................................................... G08b 19/00,
G08b 15/00
[50] Field of Search............................................ 340/181,
224, 258, 258 (C), 258 (D), 261, 276, 420;
324/43; 343/5(PD)

[56] References Cited
UNITED STATES PATENTS

| 2,979,706 | 4/1961 | Simon et al. .................. | 340/258 |
|---|---|---|---|
| 2,992,420 | 7/1961 | Riker............................ | 340/258 |
| 3,074,053 | 1/1963 | McDonough et al. ........ | 340/258 |
| 3,132,330 | 5/1964 | Donner ........................ | 340/258 |
| 3,135,199 | 6/1964 | Brown........................... | 324/43X |
| 3,156,909 | 11/1964 | Werk............................. | 340/224X |
| 3,230,454 | 1/1966 | Van Burkleo ................ | 340/224X |
| 3,249,915 | 5/1966 | Koerner ....................... | 324/43X |
| 3,296,587 | 1/1967 | Baker............................ | 340/261X |
| 3,380,044 | 4/1968 | Mordwinkin.................. | 340/258X |
| 3,383,678 | 5/1968 | Palmer ......................... | 343/5 |

Primary Examiner—Rodney D. Bennett, Jr
Assistant Examiner—Richard E. Berger
Attorneys—William R. Lane, Allan Rothenberg and Sidney Magnes

ABSTRACT: An electronic monitoring system comprising one or more remotely positioned monitoring units has a plurality of different types of sensors for detecting intrusions into the monitored area. Each type of sensor is sensitive to a different phenomenon, and their combined output signals identify an intruding target; since each target tends to have a distinctive target signature.

The sensor signals are transmitted to a monitoring-station, where an operator can determine the action to be taken.

Patented April 6, 1971

3,573,817

5 Sheets-Sheet 2

INVENTOR.
ARTIE E. AKERS
BY
Sidney Magnes
AGENT

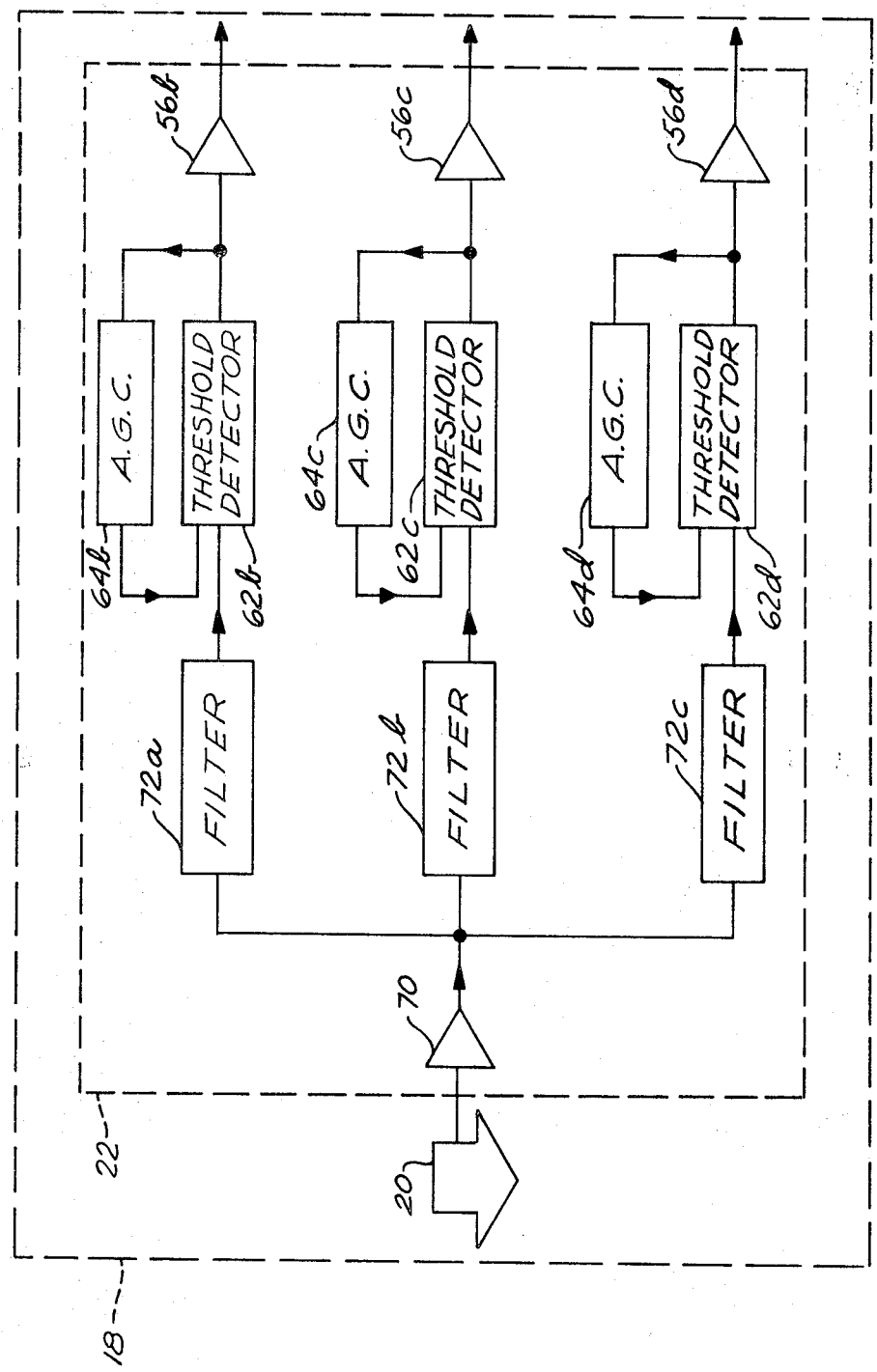

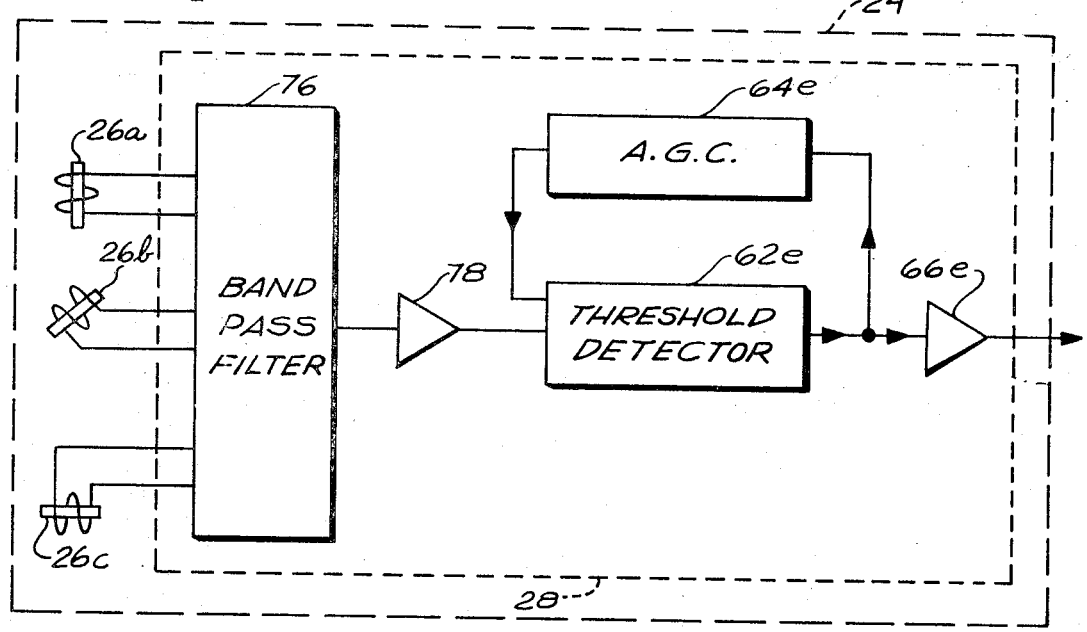
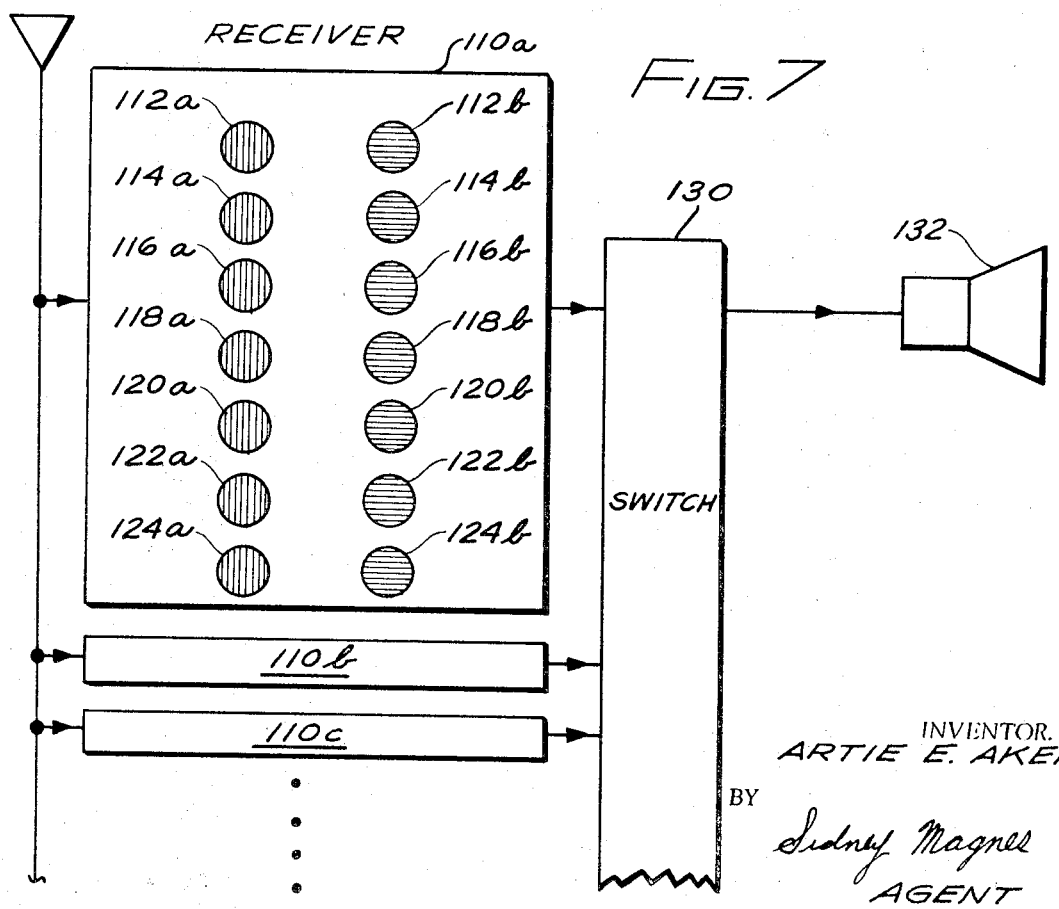
INVENTOR.
ARTIE E. AKERS
BY
Sidney Magner
AGENT

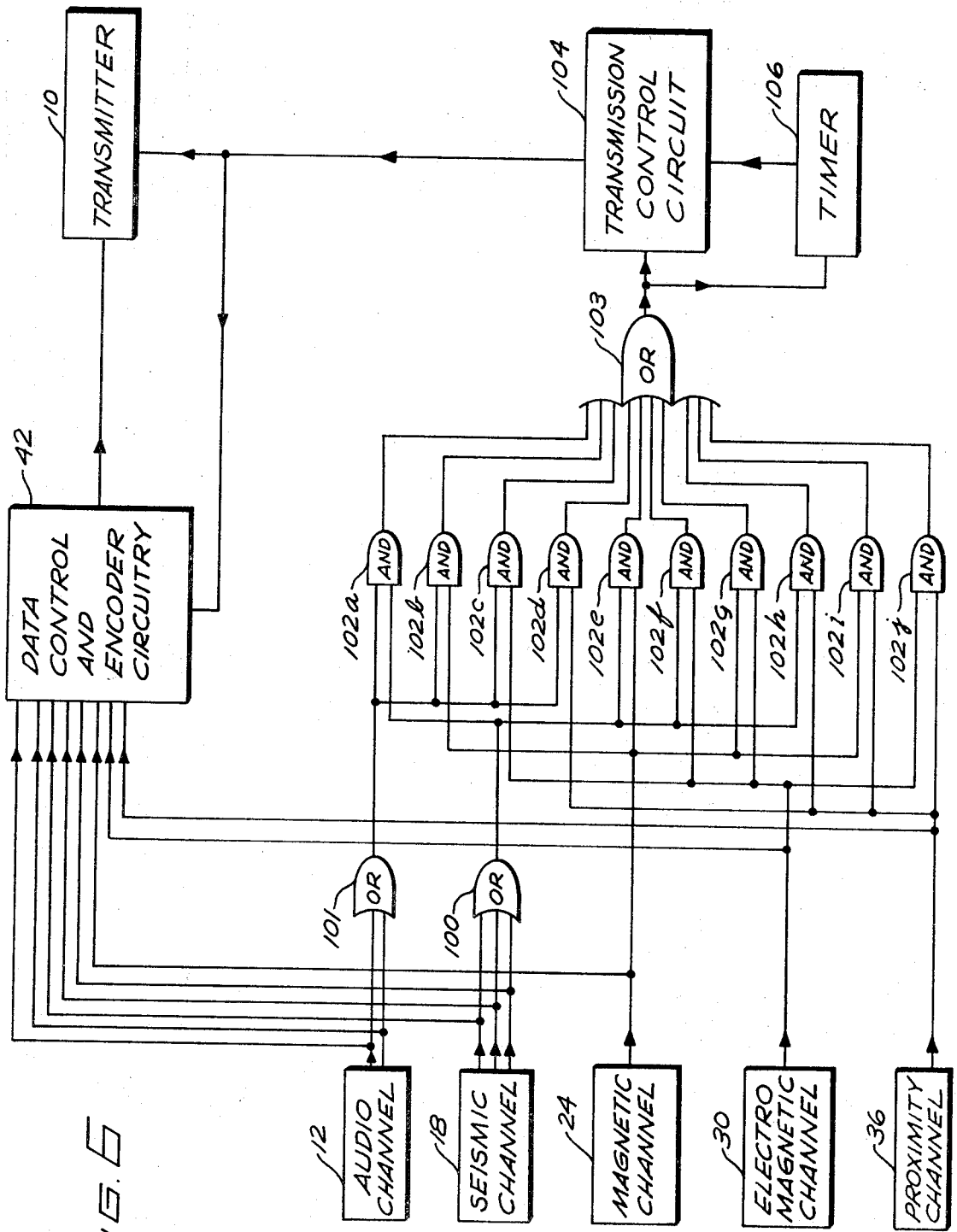

3,573,817

MONITORING SYSTEM

BACKGROUND

It is frequently advantageous to monitor and detect intrusions at various locations; commercial locations being factories and warehouses—and military locations being behind enemy lines, around airport perimeters and the like, at encampments, etc. If these areas are extremely large or in hostile environments, it becomes impracticable to monitor them by service personnel; so that an electronic monitoring system becomes extremely desirable.

Depending upon conditions of its usage, the monitoring system may be exposed to various kinds of intruding bodies. For example, the system should ideally indicate the presence and movement of large and small animals, the presence and movement of human beings, the presence and movement of equipment—such as bicycles, jeeps, and light armament—and the presence and movement of equipment such as trucks and heavy equipment. In addition, it would be desirable to know whether the men and/or animals are moving slowly, walking normally, or running; and whether the men are carrying equipment such as guns or tools. Furthermore, it would be desirable to listen in to the monitored area—as animal noise or silence, conversations, etc. could provide important information.

A good monitoring system should comprise a plurality of remotely emplaced monitoring units that transmit messages back to a monitoring station. In those cases where it is desired to monitor relatively friendly areas, such as a warehouse, an encampment, an airfield, etc., the monitoring units may be implanted by hand; and removed periodically for maintenance and repair. However, in those cases where it is desirable to monitor areas behind enemy lines, it may be necessary for the monitoring units to be airdropped; and to go into operation automatically. In some cases, it may be desirable—in order to prevent the monitoring units from falling into the hands of unfriendly individuals—to have the equipment destroy itself if it is inoperative, when it has exceeded its useful life, when it is removed by unauthorized personnel, etc.

OBJECTS AND DRAWINGS

It is therefore an object of the present invention to provide an improved electronic monitoring system.

The attainment of this object, and others, will be realized from the following detailed description and drawings of which:

FIG. 1 shows a block diagram of a monitoring-unit;

FIGS. 2—5 show block diagrams of various monitoring channels;

FIG. 6 shows a logic diagram for activating the transmitter only on the occurrence of simultaneous sensor signals from two different channels; and FIG. 7 shows a block diagram of a monitoring station.

SYNOPSIS

Broadly speaking, this application discloses an intrusion monitoring system that comprises a monitoring unit that may be hand-implanted or airdropped into remotely-located areas, in order to monitor intrusions into that area. Each monitoring unit comprises a plurality of sensors for detecting audio, magnetic, seismic, electromagnetic, and/or proximity changes that inherently accompany moving or intruding objects. Suitable circuitry compensates for changes in ambient conditions; and other circuitry transmits signals that indicate intrusions.

INTRODUCTION

It has been found that most intruding bodies produce their own individual combination of disturbances. For example, birds produce sounds; vehicles, animals, and humans produce specific seismic disturbances; some metals produce magnetic effects; certain engines produce radio "noise"; and the very presence of most intruding bodies alters the electrical "capacitance" of the monitored area. Thus, a browsing four-legged animal produces a different set of disturbances than does a running man who is loaded down with metal equipment. Similarly, a racing motorcycle produces quite different disturbances than does an innocent stroller.

As will be shown later, these various disturbances can be converted to electrical signals; and the combination of electrical signals tends to form a "target signature" of a specific intruding body. Since each intruding body tends to have its own peculiar target signature, suitable circuitry may be used to distinguish between target signatures; and to thus distinguish between intruding bodies.

DESCRIPTION

The operation of the monitoring system may be understood from the simplified block diagram of FIG. 1, wherein a transmitter 10 transmits messages corresponding to the state of various sensors. For example, an audiochannel 12—comprising an audiosensor 14, such as a microphone, and associated "audio" circuitry 16—monitors sounds; and provides an "audio" sensor signal.

A "seismic" channel 18, comprising a seismic sensor 20 and associated "seismic" circuitry 22, senses tremors or vibrations of the earth; and produces a "seismic" sensor signal.

A "magnetic" channel 24, comprising a magnetic sensor 26 and associated "magnetic" circuitry 28, monitors the ambient magnetic field. It senses when this ambient magnetic field is disturbed by the presence of a ferromagnetic material, such as iron in a gun; and produces a "magnetic" sensor signal.

An electromagnetic channel 30, comprising an electromagnetic sensor 32 and "electromagnetic" circuitry 34—monitors radiation, such as might be produced by the ignition system of an engine; and produces an "electromagnetic" sensor signal.

A proximity channel 36, comprising a proximity sensor 38 and associated "proximity" circuitry 40 senses whether there is any intrusion into a given area; and, on the occurrence of such intrusion, produces a "proximity" sensor signal.

Thus, the various channels monitor intrusions by producing sensor—or condition—signals indicative of conditions.

These sensor signals are applied, among other places, to a data control-and-encoder circuit 42 that—among its other functions—encodes the sensor signals. Thus, there is provided a way of sensing a group of different condition signals, and—upon the occurrence of predetermined requirement—actuating transmitter 10. Under suitable conditions to be discussed later, transmitter 10 produces a message that incorporates information relating to the presence—or absence—of given sensor signals. A monitoring station (discussed later) receives the transmitted message; and converts its contents to a form that permits the monitoring station operator to understand the activities at the monitored area. In this way, the disclosed system monitors an area; and has several ways of detecting changes in that area.

As previously indicated, the monitoring device may be airdropped; in which case its impact with the ground activates a "G-switch" 50 that energizes an antenna launcher 52; this—in some embodiments—causing the antenna of transmitter 10 to be erected preparatory to transmitting messages.

Various antenna launchers may be used; some ejecting a vertical telescoping antenna, others using compressed gas to throw a grapnel-type line to the forest canopy, etc.

It was pointed out above, that it is undesirable for the monitoring unit to fall into hostile hands; so that in situations where this danger exists, a "destruct" system 54 is incorporated into the package. The destruct system may be activated in a number of ways. For example, the destruct system may be energized if the package happens to land at such an angle that its antenna will not transmit the messages properly. There are other times when there is a possibility of the package being withdrawn from the ground, and analyzed; and to prevent this, the destruct system is activated when withdrawal pressure is applied. Another destruct initiating arrangement has a circuit that senses when the batteries have outlived their usefulness; whereupon the destruct system destroys the package.

In those cases where the package is used around an airport or a friendly area, and it is desired to repair the equipment, a removal switch 56 is used to disable the destruct system; and permits the package to be safely withdrawn from the ground, and to be carried to a repair depot.

In some cases it is undesirable to destroy the package by explosion, and in these cases the destruct system may comprise a corrosive acid that destroys crucial parts of the device.

THE AUDIOCHANNEL

It has been found that one of the most satisfactory ways of monitoring activities in an area is to actually listen in to what is happening. For example, normal ambient noises indicate a quiescent situation; silence or fleeing animals may indicate an approaching body; footsteps or engine noises indicate the type and approach-rate of a body; and conversations provide specific details of activities.

Figure 2:
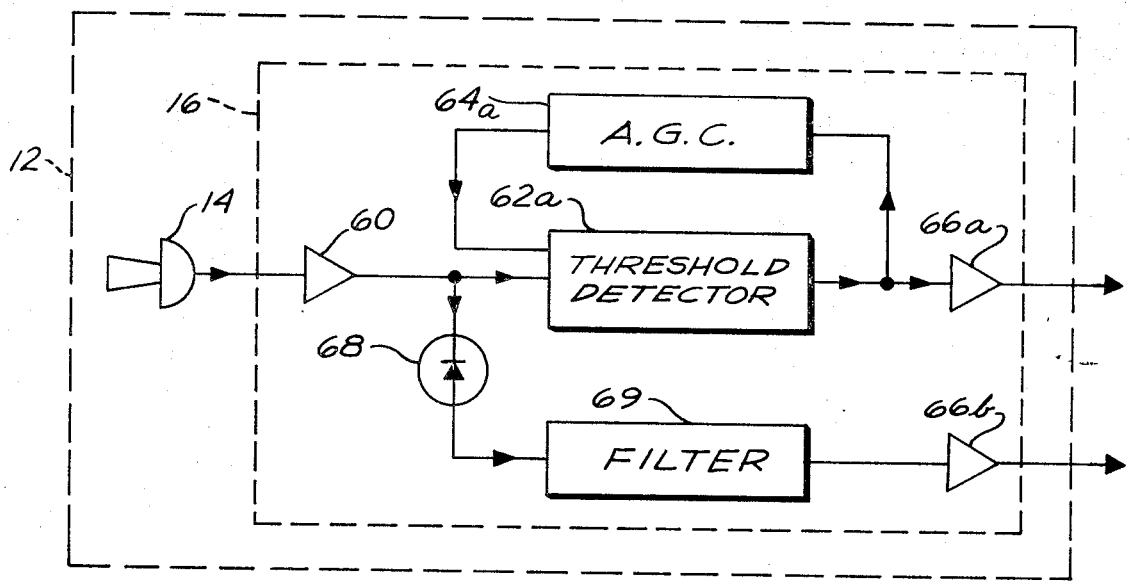

To obtain this knowledge, audiosensor 14 may comprise one or more microphones, which may be differently oriented; or, preferably, be of the ceramic crystal type—because of their substantially omnidirectional pickup characteristics, and their ability to withstand temperature variations and relatively high shocks. As shown in FIG. 2, the audio signal from microphone system 14 is first fed to a preamplifier 60 having appropriate gain, bandwidth, and stabilizing characteristics; the output signal from preamplifier 60 being applied to a threshold detector 62a that produces an output-signal when a given threshold value is exceeded. Threshold detector 62a will be discussed in terms of a linear amplifier; but may take a number of forms such as (a) an amplifier that produces expanded or compressed output signals for given input signals, (b) a circuit such as a Schmidt trigger that provides an output signal when the input signal exceeds a given value, (c) suitably-poled diodes, etc.

A slight digression is necessary at this point. It has been found desirable to compensate for changes in the "background" noise level, as may be understood from the following discussion. Ordinarily the "background" noise is quite high during the daytime, and decreases with the arrival of evening. However, if the audiochannel sensitivity level is set to prevent normal daytime background noise levels from producing false alarms, the equipment may fail to pick up an unusual faint night time noise.

On the other hand, if the audiochannel sensitivity level is set to pick up faint night time noises, the normal daytime background noises would produce continual false alarms. To overcome this problem, a compensating circuit 64a—such as an automatic-gain-control (AGC), or an automatic-volume-control (AVC) circuit is connected across the threshold detector 62a. Compensating circuit 64a senses the background noise level, as indicated by the presence and/or magnitude and/or absence of a signal from the threshold detector; and adjusts the gain of the threshold detector 62a. AGC and AVC circuits are well-known, and their circuitry and operations are discussed in "Radio Engineers Handbood" by F. E. Terman. Briefly stated, the operation is as follows.

During the daytime, the relatively high ambient noise level causes the threshold detector 62a to produce an output signal (which would be a meaningless false alarm). The automatic-gain-control circuit 64a detects this output signal, and operating in its well-known manner, lowers the gain of the threshold detector. If the ambient noise level still produces a threshold detector output signal, the operation is repeated; until eventually the gain is low enough to prevent false alarm threshold detector output signals due to the relatively high daytime ambient noise level. Various wave-shaping and time constant circuits direct slowly varying or small changes through the compensating circuitry to effect gain control of the threshold detector; but abrupt or loud noises are directed through the threshold detector to amplifier 66a.

With the approach of evening, the ambient noise level decreases; the automatic gain control circuit senses the absence of a threshold detector signal, and raises the gain. This operation is repeated until the gain is high enough to cause the threshold detector to produce an output signal. The AGC circuit senses the threshold detector output signal (false alarm in this case) and—as explained above—now produces a progressively lower gain until the threshold-detector signal disappears. Now, an abrupt or unusual noise would produce a meaningful signal. In this way, as the ambient background noise level varies, the AGC voltage prevents spurious signals; but on the occurrence of an abrupt change in the acoustic level, the instantaneous threshold level is exceeded—and a valid audiosensor signal is produced. If desired, the compensating circuit—rather than being activated continuously—may be activated periodically, by suitable timers.

As is well-known known to those skilled in the electronics art, the output of compensating circuitry of the type discussed above may also be used to establish reference levels for Schmidt trigger circuits, diodes, and the like; and may be incorporated into operational amplifiers that may also serve a threshold detection function.

As indicated previously, varying ambient condition changes cause threshold detector 62a of FIG. 2 to produce ambient change adjustment signals; and since the ambient changes are small and slow, the adjustment signals tend to be small, slowly changing, and of short duration.

However, a meaningful sensor signal tends to be strong, rapidly changing, and of longer duration; and these meaningful signals are to be applied to an amplifier, 66a of FIG. 2, for further use.

It is therefore desirable to direct the small, slowly changing, short duration adjustment signals from threshold detector 62a to compensating circuitry 64a; and to direct the stronger, rapidly changing, longer duration meaningful signals from threshold detector 62a to amplifier 66a. This effect is readily achieved by suitably biassing the amplifier circuitry in order to nullify small signals, and by the use of well-known timing circuits (similar to those used in television for separating sync signals, and the like).

Thus, audiochannel 12 produces valid audiosignals that cover the range of about 30 Hz. to 75,000 Hz.; a range that includes the snapping of twigs, the rustle of clothes, and the sounds of plodding footsteps—each contributing to a particular target signature.

As mentioned above, a sudden silence may indicate an intrusion; and a "silence" signal may be desired for indicating this condition. However, the audiochannel circuitry of FIG. 2 may not produce a "silence" signal, since its polarity-response and compensating circuitry tend to operate for a different type input signal.

However, a slight modification permits the audio circuitry 16 of FIG. 2 to be used for generating the above-described silence signal. The modification comprises a "tap" at the output end of preamplifier 60; a polarity-control diode 68; and a filter 69—these operating as follows. Upon the occurrence of a sudden silence, audiosensor 14 developes a negative-going, or decreasing signal; and this is transmitted by suitable-poled diode 68, which may be properly biassed to transmit only those signals having or exceeding a desired amplitude. The output of diode 68 is applied to filter circuit 69, which passes only the sudden-silence signals to amplifier 66b. Filter 69 may comprise a series connection of one or more relatively-small capacitors that favor the passage of the "sudden" signals, and a shunt connection of one or more coils that bypass the slowly-changing signals. In this way, audiocircuitry 16 compensates for gradual changes in ambient noise level, and still detects sudden change of either increase or decrease in audio levels.

THE SEISMIC CHANNEL

Seismic sensor 20 (see FIG. 1) detects tremors of the earth; so that movements of an animal, a human being, a vehicle, etc. cause seismic sensor 20 to produce an output signal. The seismic sensor may be a "geophone," such as is made by Hall-Sears, Inc., of Houston, Texas; and is coupled to the earth by an implantation spike that is an integral part of the geophone—and forms the nose of an airdropped monitoring unit. A crush-type material may be positioned adjacent of the geophone to assure desired implantation, without exposing the airdropped package to excessive shock.

It has been determined that a walking animal produces seismic impulses at a given rate; and that running animals produce seismic pulses at proportionally higher rates. A human being, having 2 feet rather than 4, produces seismic impulses at a corresponding lower frequency while walking; and at a corresponding higher frequency while hurrying and running; the spectrum-range extending from about 5 Hz. to 35 Hz. It has also been found that the movement of vehicles such as bicycles, motor bikes, and the like produces their own seismic-frequency signals.

Therefore, the output of seismic sensor 20 may be divided into a number of spectrums—such as 7 Hz., 30 Hz., and 75 Hz.—these helping, in cooperation with other sensor signals, to identify the target signature of a slowly moving man, a rapidly moving man, the movement of animals and vehicles, etc.

As shown in FIG. 3 the output of seismic sensor 20 is applied to a suitable-frequency amplifier 70, and then fed to a plurality of band-pass filters 72a, 72b, and 72c that pass frequencies of the selected ranges. These filters eliminate undesired signals—such as those characteristic of sonic boom, for example—and permit the circuitry to "recognize" signals within the spectra of interest; thereby enhancing target trees, plants, fences, poles, etc. cause a seismic disturbance called "root noise," in certain cases it is desirable to compensate for these ambient-condition noises; and, to achieve this result, the output of each filter 72a, 72b, and 72c may be passed to corresponding threshold detector units 62b, 62c, and 62d having AGC circuits 64b, 64c, and 64d, as previously discussed; thus applying—to amplifiers 56b, 56c, and 56d—valid seismic sensor signals that have been compensated for ambient noise conditions.

THE MAGNETIC CHANNEL

Magnetic sensor 26 (see FIG. 1) is of the type that monitors the ambient magnetic field of the earth, and produces an output signal when this ambient magnetic field is disturbed. it is well known that when a ferromagnetic material—such as iron—is placed in the earth's magnetic field, it becomes magnetized; and developes within itself a pair of magnetic poles and an associated magnetic field. As this anomalous magnetic field moves, or is carried, past a monitoring point, the composite earth-and-anomalous magnetic field undergoes a strength-time variation; and a magnetic sensor will produce a "magnetic" signal. The type of magnetic sensor known as the "magnetic field magnetometer" produces an output signal that corresponds to the instantaneous earth-and-anomalous magnetic field strength—and is discussed in "Space Probes and Planetary Exploration" by William Corliss under the caption "Magnetic Field Measurements." Another type of magnetic sensor, known as the "magnetic variometer," produces an output signal that corresponds to the variations between the magnetic sensor and a changing magnetic field. An improved version of such a variometer is disclosed in U.S. Pat. application "Magnetic Field Variometer," Ser. No. 643,873, filed Jun. 6, 1967 by Donald P. Williams. Thus, magnetic sensor 26 produces an output signal when a ferromagnetic object—such as a gun, a bicycle, a vehicle, or the like—is carried, or moved, past the monitoring unit.

It has been found that the largest magnetic signal is produced when the ferromagnetic object is parallel to the earth's magnetic field; but since (I) a carried object's orientation would tend to be random, and (II) the direction of the earth's magnetic field varies according to its geographical location, it is desirable to use a plurality of magnetic sensors that have various orientations—i.e., some should be parallel to, angled to, and perpendicular to the ground.

It has also been found that the movements of a gun-carrying human being and various vehicles produce magnetic sensor signals in a given frequency range; so the circuit of FIG. 4 shows the output of a plurality of differently-oriented magnetic sensors 26a, 26b, and 26c being applied to a band-pass filter 76 having the desired range. The output of the filter may be applied—if desired—to an amplifier, 78; and a threshold detector and AGC circuit combination—62e, 64e—as discussed above, may be used to minimize ambient variations; and to produce valid magnetic sensor signals.

THE ELECTROMAGNETIC CHANNEL

Electromagnetic channel 30, of FIG. 1, is a radio receiver tuned to a suitable frequency or group of frequencies; and comprising antenna 32 and suitable radio-receiver circuitry 34. It has been found that the ignition systems of engines radiate electromagnetic energy of various frequencies; so that channel 30 is capable of producing valid electromagnetic sensor signals in the presence of engines used for vehicles, power-generation, pumping, and the like.

THE PROXIMITY CHANNEL

Proximity sensor 38 and associated circuitry 40 of FIG. 1 detect when a body enters the monitored area. Details of a circuit of this type that is preferred for use with this invention are in a copending Pat. application "CONDITION SENSING APPARATUS," Ser. No. 622,240, filed Mar. 10, 1967, by Artie E. Akers et al.

Figure 5:
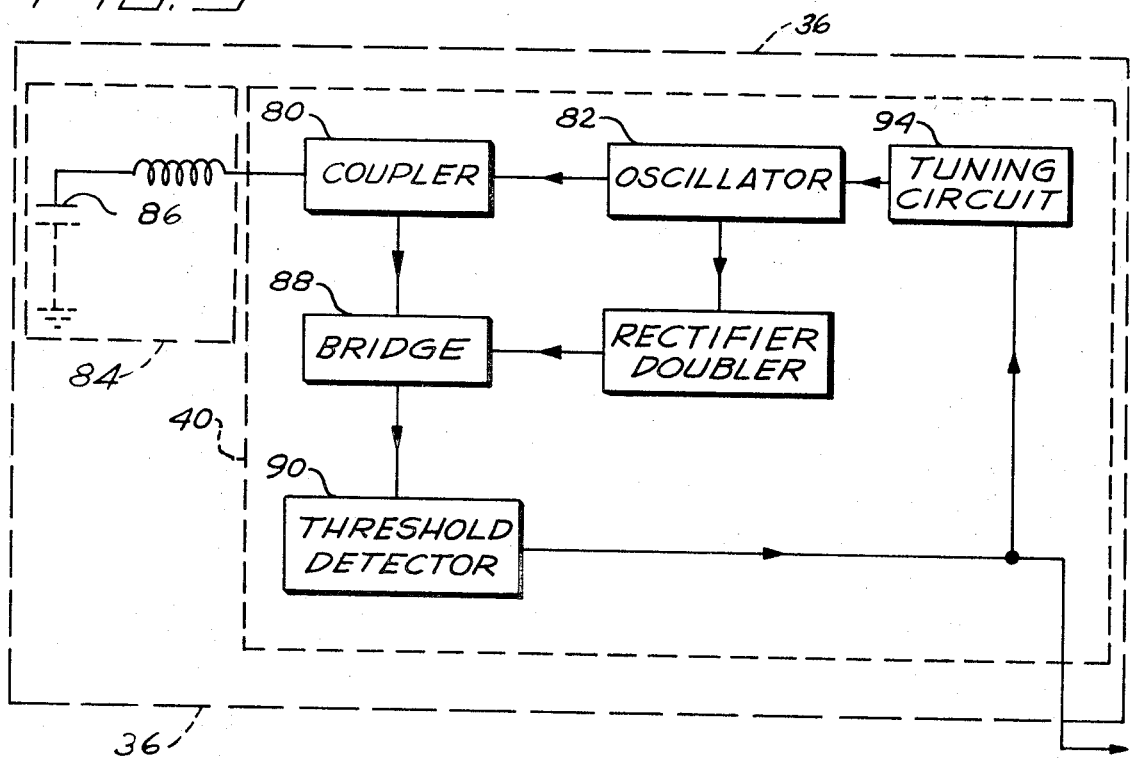

The proximity circuit 40 is shown broadly in FIG. 5. A coupling circuit 80 couples a Hartley-type oscillator 82 to an inductive-capacitive resonant circuit 84 of which the capacitance is formed between a sensing element 86, such as a wire, and the earth. When a body intrudes into the area, it changes the earth-to-sensor capacitance; and a signal is applied to a bridge circuit 88 that is normally balanced by a signal from oscillator 82. The now-unbalanced bridge circuit 88 activates a threshold detector 90 that uses predetermined time constants to minimize false alarm signals due to spurious electrical noises and random electrical spikes. The output of threshold detector 90 is thus a valid proximity sensor signal.

It is known that atmospheric conditions (temperature, humidity, etc.) change the proximity circuit's sensor-to-earth capacitance. These changes have a negligible effect in low-sensitivity proximity circuits; but in higher-sensitivity circuits, a compensating action should be introduced. FIG. 5 incorporates such a compensating circuit; comprising a tuning arrangement 94 having a motor, switch, timer, etc., for periodically repositioning the tuning elements of the oscillator, in order to compensate for variations in ambient conditions. However, rather than using a power-hungry motor, the compensating arrangement may use the AGC approach described above. In this latter case, however, the control signal would be applied to a tuning capacitor formed of a voltage-sensitive material—such as barium titanate. In this way, the AGC control voltage is used to retune the proximity circuit to ambient conditions, with minimal power requirements.

An intruding body, however, causes conditions that produce a large, or rapidly-changing signal, and the compensating arrangement is not capable of retuning the proximity circuit to a sufficient extent to null out the effect of the intrusion body. Therefore, the intrusion produces a proximity sensor signal for the time interval of intrusion—after which the circuit retunes itself to ambient conditions. If desired, the proximity signal may also be generated during the retuning operation.

It has been found that by metallizing one of the guiding fins of the airdrop configuration, the metallized film can be used as the sensing element 86; and, with suitable switching, as the transmitter antenna. The relatively limited range of frequencies may be used advantageously in designating the equipment.

THE TRANSMITTED MESSAGE

Circuitry of the illustrated types may be made so sensitive that it produces output signals that indicate the presence of very small animals—which, of course, would produce a "false alarm". The sensitivity of these circuits could be reduced in order to prevent such false alarms; but under these conditions of reduced sensitivity, the circuitry might fail to sense larger intrusions at a greater distance. In order to maintain high sensitivity, and still minimize false alarms, the following two-simultaneous signal concept is used. Briefly, according to this concept an alarm is given (e.g., a message is transmitted) when, and only when, some combination of two or more of the sensor channels produce simultaneous outputs.

Under this concept, for example, a proximity signal and simultaneous seismic signal would indicate an intrusion and provide an indication of the speed of the intruding body; these two signals being used in conjunction to indicate whether the intruding body is an animal, a man, or a vehicle. Thus, by waiting until two simultaneous signals are received, the possibility of false alarms is minimized; power requirements are reduced; and more target information is obtained.

In a similar manner, a proximity signal and a simultaneous magnetic signal indicates the presence of a body carrying an iron object; and this correlation of signals distinguishes between the presence of a man carrying a weapon, and an animal.

Similarly, simultaneous signals from electromagnetic sensor 32 and from seismic sensor 20 indicate a vehicle, and its velocity.

Thus, the simultaneous-signal concept minimizes the danger of false alarms; provides longer-lived equipment, by activating it only when meaningful information is to be broadcast; produces signals that tend to be characteristic of the target's signature; and helps discriminate between different targets.

The simultaneous-signal concept may be implemented as shown in FIG. 6. Referring first to the seismic channel 18, it will be recalled (see FIG. 3) that three possible seismic signals—of different frequency ranges—may be produced; and FIG. 6 indicates that all of these three signals are applied to an OR circuit 100 that produces an alarm signal at the occurrence of a seismic signal in any of the spectrums of interest.

Similarly, audiochannel 12 may produce two possible signals; and FIG. 6 indicates that these two signals are applied to an OR circuit 101 that produces an alarm signal on the occurrence of either a noise or a sudden-silence audiosignal.

Thus, in FIG. 6, there may be signals from any of the channels, audiochannel 12, seismic channel 18, magnetic channel 24, electromagnetic channel 30, or proximity channel 36; and any two simultaneous channel signals are to produce an alarm signal that may be used to activate the transmitter.

This result is achieved by the logic-network of FIG. 6, wherein AND circuits 102a, 102b, 102c, etc. produce an alarm signal when their respective inputs are energized simultaneously; the overall network thus causing a simultaneous occurrence of any two channel signals to produce an alarm signal at the output end of OR circuit 103. The resultant alarm signal is in turn applied to transmission-control circuit 104; and an activating-signal from transmission-control circuit 104 energizes transmitter 10 for predetermined time interval, to be discussed later in greater detail. In this manner the occurrence of a set of predetermined conditions is indicated by the electrical signals.

When circuit 104 energizes transmitter 10, it also causes a switching arrangement in data-control-and-encoder circuit 42 to sequentially "sample" incoming sensor signals. Many "sampling" techniques are known and widely used; these ranging from simple rotary switches to the complex telemetry devices used for space and lunar exploration. Basically, in sampling (also known as encoding, modulating, commutating, etc.) each of a plurality of incoming signals is sampled; time-multiplexed with other samples; and transmitted in an identifying sequence or with other sample identifying information. Depending upon system requirements, the samples may vary in amplitude, frequency, pulse rate, pulse duration, pulse height, or other factors. A more comprehensive discussion is presented in "Aerospace Telemetry" by Henry L. Stiltz. In any case, circuitry 42 of FIG. 6 applies corresponding time-multiplexed sensor signals to the transmitter; the signals forming a message that is transmitted in a manner to be discussed later.

As indicated previously, human beings place the most value on the information obtained from the audiochannel; so the silence signal is merely used as an alarm; and the "audible" audiosignal is preferably transmitted for a major portion (about nine-tenths) of the transmit interval by means of a suitable sampling technique. During the remaining tenth of the transmit interval, the data-control-and-encoder circuit 42 sequentially applies the other sensor signals to the transmitter. These signals are preferably transmitted in an "encoded" form; i.e., tone-encoded, and transmitted as a train of time-sequenced tones—pulse-encoded and transmitted as a train of pulses, etc. One state, say the positive-pulse or the tone state, may be used to indicate the presence of a given sensor signal; and the other, negative state, may be used to indicate the absence of a given sensor signal. Depending upon requirements, the audiosignal may also be encoded, or may be transmitted as a modulation. It will be understood, of course, that the messages from transmitter 10 may be transmitted over a hard wire, or a radio link to a monitoring station.

If desired, in the absence of sensor signals, suitable timing circuitry 106 may be used to transmit an "all's well" signal, in order to advise the monitoring station that the monitoring unit is operating satisfactorily—but has nothing to report. The all's well signal may comprise the instantaneous "negative-state" signals from the various sensors; or may comprise a special signal created for the purpose.

Thus, the transmitted message is a compaction of sensing signals and—where necessary—a synchronizing signal, that is transmitted to a monitoring station. Here, an observer may monitor one, or many areas that have emplanted monitoring units.

THE RECEIVER

As indicated in FIG. 7, the monitoring station has a plurality of receivers 110a, 110b, 110c, etc.; individual receivers being tuned to the mutually distinguished transmitter-carrier frequency of respective emplanted monitoring units.

As indicated for receiver 110a, each receiver has apparatus for sensibly presenting the received information, that is, presenting it in a form acceptable to the operator. This sensible presentation may be audible, visible, tactile, etc., FIG. 7 illustrating a plurality of indicators 112a and b, 114a and b, 116a and b, 118a and b, etc.—respective pairs of indicators being responsive to signals from the audio, seismic, magnetic, electromagnetic, and proximity channels. Thus, the state of the condition signals is presented in a concerted grouping for mutual correlation by the operator or by suitable equipment.

The presence of a tone or a positive-state encoded pulse flashes a red indicator to indicate a positive-state sensor signal; whereas the absence of such a sensor-signal flashes a corresponding blue indicator to indicate a negative-state sensor signal. Thus, the multiplexed sensor signals flash indicators to indicate which sensors are producing signals. Since it is known that various intrusions produce characteristic combinations of condition signals that form a target signature for that intruding body, the indicated combination of received signals may be compared with these known combinations, in order to identify the type of intrusion.

It will be noted that tone-encoding and tone resonant circuitry automatically directs each message to its corresponding indicator—thus providing automatic decoding; whereas pulse-encoding may require a synchronizing signal.

In addition to the above indicators, a switch 130 of FIG. 7 permits the audiosignal from any receiver to be applied to a speaker 132. Therefore, the indicator pattern, taken in conjunction with the audio message, forms a distinctive target signature; all of the sensor signals cooperating and correlating with each other to provide complete target identification that distinguishes one target from another.

In those cases where an all's well signal is received, the described circuitry automatically flashes all the blue indicators; thus producing an easily recognized indication.

In the case of pulse-encoded sensor signals, the receiver decodes the incoming signal by comparing the incoming signal with a coded reference; and the result determines whether the red or blue indicator is flashed. The subsequent operation is the same as described above, except that a synchronizing signal is desirable in order to pairup the incoming signal and its corresponding indicator. Since the audiosignal is so different than the other signals, it may be used for synchronization purpose—serving as a starting point for the sensor signal reception; although, as indicated above, a special synchronizing signal may be generated at the monitoring unit.

In this way, the target signature, as indicated by the indicator-pattern, always informs the monitoring station operator of the activities at the remote unattended monitoring units; and the operator can tune in to the audiosignal from any selected monitoring unit.

HOMING ARRANGEMENT

There are some conditions that, in the judgement of the monitoring station operator, justify the dispatch of observation or attack aircraft to one or more of the monitored areas. Since the monitoring units may have been airdropped, their exact location may be unknown; and poses a locating problem for the aircraft.

To solve this problem, the monitoring unit may be designed to act as a "homing beacon," by broadcasting a signal that the aircraft uses to find the monitoring unit. This "homing signal" may be the message itself, the carrier-wave onto which the message is modulated, or a separate homing signal.

In order to transmit the homing signal, the monitoring unit may be "instructed" to do so by remote control, or by internal timing-circuitry 106—such as a timer, switch, AND circuit, etc., that recognizes a repetitive or predetermined target signature, etc. In this way, the disclosed multisensor monitoring system may have increased value.

Although the invention has been described and illustrated in detail, it is to be clearly understood that the same is by way of illustration and example only, and is not to be taken by way of limitation; the spirit and scope of this invention being limited only by the terms of the appended claims.

I claim:

1. A combination for detecting and identifying an intruding body having a target signature, comprising:
   a plurality of sensing channels containing sensors, said sensors being electrically connected to cause selected sensors to be activated by an intruding body, and to produce correlated sensor signals corresponding to the target signature of the intruding body; and
   means for compositing said correlated sensor signals into a message indicative of the characteristics of said intruding body—whereby the pattern of said correlated sensing signals aids in detecting said body, and identifying its target signature.

2. A monitoring unit comprising:
   a plurality of sensing channels having sensors being associated with respective channels; and
   electronic circuit means for causing said sensing-channels to produce composited sensor signals indicative of the target signature of an intruding body.

3. A monitoring unit comprising:
   A. a plurality of sensing channels for producing sensor signals—one sensing channel comprising an audiosensor, one sensing channel comprising an electromagnetic sensor, one sensing channel comprising a seismic sensor, one sensing channel comprising a magnetic sensor, and one sensing channel comprising a proximity sensor;
   B. means for adjusting selected sensing channels for ambient conditions;
   C. means for compositing said sensing signals into a correlated signal corresponding to a target signature of an intruding body; and
   D. means for transmitting said correlated signal to a monitoring station for identifying the target signature.

4. A monitoring system comprising:
   I. a plurality of monitoring units, each unit having;
      a. a plurality of sensing channels, having different-type sensing means associated with respective channels,
      b. means for causing said sensing channels to produce sensor signals;
      c. means for compositing said sensor signals into a target signature corresponding to an intruding body,
      d. means for transmitting a message comprised of said composited target signature; and
   II. a plurality of receivers, respective receivers adapted to receive the message transmitted from a selected monitoring unit, each receiver having;
      e. means for identifying the target signature in said message.

5. A monitoring system comprising:
   I. a plurality of monitoring units, each having;
      A. a plurality of sensing channels for producing sensor signals—one sensing channel comprising an audiosensor, one sensing channel comprising an electromagnetic sensor, one sensing channel comprising a seismic sensor, one sensing channel comprising a magnetic sensor, and one sensing channel comprising a proximity sensor,
      B. means for adjusting selected sensing channels for ambient conditions,
      C. means for encoding selected sensor signals for transmission,
      D. means for compositing said sensor signals into a target signature message having a given time interval, the sensor signal from the audiosensing channel occupying a relatively-large portion of said time interval, and
      E. means for transmitting said target signal message, only on the occurrence of at least two simultaneous sensor signals, to a monitoring station;
   II. a plurality of receivers, respective receivers being tuned to a single selected monitoring unit for receiving the target signature message transmitted therefrom,
      F. each receiver having means, comprising indicators, for indicating the presence of said target signature from its associated monitoring unit, and
      G. means for converting the audio sensor-signal from any receiver into an audible form.

6. The method of monitoring an intrusion, by sensing a target signature composed of a group of different condition signals, comprising the steps of:
   selecting relatively-limited frequency ranges for the sensing of individual ones of the condition signals;
   minimizing the effects upon the sensing of ambient background within said frequency ranges; and
   indicating sensing of at least a predetermined target signature contained in said signals.

7. The method of claim 6 including the step of periodically indicating the absence of at least a predetermined target signature in said sensed condition signals.

8. The method of claim 6 including the step of sensibly presenting each of the condition signals in concert for a mutual correlation—whereby the combination of sensed condition signals may be compared with condition signals known to result from known intrusions, and the nature of the intrusion may thus be identified.